(12) United States Patent
Cheng et al.

(10) Patent No.: US 10,163,042 B2
(45) Date of Patent: Dec. 25, 2018

(54) FINDING MISSING PERSONS BY LEARNING FEATURES FOR PERSON ATTRIBUTE CLASSIFICATION BASED ON DEEP LEARNING

(71) Applicant: International Business Machines Corporation, Armonk, NY (US)

(72) Inventors: Yu Cheng, Ossining, NY (US); Rogerio S. Feris, Hartford, CT (US); Clifford A. Pickover, Yorktown Heights, NY (US); Maja Vukovic, New York, NY (US); Jing Wang, Evanston, IL (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/226,339

(22) Filed: Aug. 2, 2016

(65) Prior Publication Data
US 2018/0039867 A1     Feb. 8, 2018

(51) Int. Cl.
*G06K 9/00* (2006.01)
*G06K 9/66* (2006.01)
*G06K 9/46* (2006.01)

(52) U.S. Cl.
CPC ........... *G06K 9/66* (2013.01); *G06K 9/00268* (2013.01); *G06K 9/00536* (2013.01);
(Continued)

(58) Field of Classification Search
CPC ........ G06K 9/00268; G06K 9/46; G06K 9/66; G06K 9/00496; G06K 9/00523;
(Continued)

(56) References Cited

U.S. PATENT DOCUMENTS 5,465,308 A    11/1995   Hutcheson et al.
7,142,697 B2   11/2006   Huang et al.
(Continued)

FOREIGN PATENT DOCUMENTS

CN        103902734       4/2014
JP         2004126711      4/2004
(Continued)

OTHER PUBLICATIONS

McCoppin et al. ("Electro-optical seasonal weather and gender data collection," Proc. SPIE. 8751, Machine Intelligence and Bio-inspired Computation: Theory and Applications VII, May 28, 2013) (Year: 2013).*

(Continued)

*Primary Examiner* — Yubin Hung
(74) *Attorney, Agent, or Firm* — Cahn & Samuels, LLP

(57) ABSTRACT

An embodiment of the invention provides a method for finding missing persons by learning features for person attribute classification based on deep learning. A first component of a neural network identifies geographic locations of training images; and, a second component of the neural network identifies weather information for each of the identified geographic locations. A third component of the neural network generates image pairs from the training images. For each image pair of the image pairs, the third component of the neural network determines whether images of the image pair include the same person. The neural network generates neural network parameters with the identified geographic locations, the weather information for each of the identified geographic locations, and the determination of whether the images of the image pairs include the same person.

19 Claims, 9 Drawing Sheets

(52) U.S. Cl.
CPC ..... *G06K 9/00677* (2013.01); *G06K 9/00684* (2013.01); *G06K 9/46* (2013.01)

(58) Field of Classification Search
CPC .......... G06K 9/00536; G06K 9/00624; G06K 9/00664; G06K 9/00677; G06K 9/00684
See application file for complete search history.

(56) References Cited

U.S. PATENT DOCUMENTS

| | | | |
|---|---|---|---|
| 8,068,676 | B2 | 11/2011 | Zhang et al. |
| 8,195,598 | B2* | 6/2012 | Hua .......................... G06N 5/02 382/100 |
| 8,379,920 | B2 | 2/2013 | Yang et al. |
| 8,452,096 | B2 | 5/2013 | Doretto et al. |
| 8,798,362 | B2 | 8/2014 | Wang et al. |
| 2005/0012624 | A1* | 1/2005 | Charen .............. G08B 21/0202 340/573.4 |
| 2007/0237364 | A1* | 10/2007 | Song ................... G06K 9/00369 382/115 |
| 2010/0316265 | A1* | 12/2010 | Nakanowatari .... G06K 9/00288 382/118 |
| 2011/0274314 | A1* | 11/2011 | Yang ................... G06K 9/00369 382/103 |
| 2012/0007975 | A1 | 1/2012 | Lyons et al. |
| 2013/0142423 | A1 | 6/2013 | Zhang et al. |
| 2017/0032436 | A1* | 2/2017 | DiSalvo ............. G06Q 30/0613 |
| 2017/0154212 | A1 | 6/2017 | Feris et al. |

FOREIGN PATENT DOCUMENTS

| | | |
|---|---|---|
| JP | 2013069128 | 4/2013 |
| JP | 2013186546 | 9/2013 |

OTHER PUBLICATIONS

Filković et al. ("Deep metric learning for person Re-identification and De-identification," 2016 39th International Convention on Information and Communication Technology, Electronics and Microelectronics (MIPRO), May 30-Jun. 3, 2016) (Year: 2016).*

Khosla et al.; Ttl: Intelligent online Web based interactive missing person clothing identification system; Publication Ttl: 2006 IEEE Conference on Systems, Man, and Cybernetics, pp. 4022-4027; 2006; Publisher: IEEE; Country of Publication: USA; ISBN: 1424400996; Database: INSPEC.

Liu et al., Deep Learning Face Attributes in the Wild, ICCV, pp. 3730-3738, 2014.

Gallagher et al., Clothing Cosegmentation for Recognizing People, CVPR, 2008.

Kiapour et al., Hipster Wars: Discovering Elements of Fashion Styles, pp. 1-15, ECCV, 2014.

Kwak et al., From Bikers to Surfers: Visual Recognition of Urban Tribes, BMVC, pp. 1-12, 2013.

Abstract of Song, Z., Predicting occupation via human clothing and contexts, International Conference on Computer Vision, 2011.

* cited by examiner

US 10,163,042 B2

FINDING MISSING PERSONS BY LEARNING FEATURES FOR PERSON ATTRIBUTE CLASSIFICATION BASED ON DEEP LEARNING

BACKGROUND

The present invention relates to systems, methods, and computer program products for finding missing persons by learning features for person attribute classification based on deep learning.

For individuals diagnosed with Alzheimer's or Pre-Alzheimer's disease and their families, there may be incidents of people "wandering off" who need to be found. A person with Alzheimer's may not remember his or her name or address, and can become disoriented, even in familiar places. Furthermore, six in ten people with dementia will wander. Nearly half of children with autism will wander from safe environments. More than one-third of children who wander are considered nonverbal. Finding and safely recovering a missing child with autism presents unique and difficult challenges for families, law enforcement, first responders and search teams.

SUMMARY OF THE INVENTION

An embodiment of the invention provides a method for finding missing persons by learning features for person attribute classification based on deep learning. A first component of a neural network identifies geographic locations of training images; and, a second component of the neural network identifies weather information for each of the identified geographic locations. A third component of the neural network generates image pairs from the training images. The image pairs are generated automatically by an image pair generator and a video processing module that includes an object detector and tracker to detect and track people over a video sequence. For each image pair of the image pairs, the third component of the neural network determines whether images of the image pair include the same person. The neural network generates neural network parameters with the identified geographic locations, the weather information for each of the identified geographic locations, and the determination of whether the images of the image pairs include the same person.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method for finding missing persons based on a description of physical attributes (e.g., hair color and style, facial hair, etc.) and clothing attributes (e.g., jackets, t-shirts, color, texture, etc.). Given an input image of a person, the facial and clothing attributes can be estimated using a deep neural network module for feature extraction followed by a classifier. The parameters of the deep neural network can be learned through a feature learning engine, which can be trained to simultaneously predict geo-location, weather information, and/or face/clothing similarity of image pairs. The image pairs can be obtained by a video processing module in order to learn discriminative features for person attribute classification. Image and/or video capture may be performed with drones or wearable cameras. Based on the estimated attributes, one or more candidates for a missing person can be identified with confidence level L.

In at least one embodiment, the network parameters are initialized based on a method which uses geo-location and weather information to learn features for person attribute classification from video and for particular cohorts (e.g., people with Alzheimer's, children, autism) without requiring manually labeled data. The feature learning engine may not require costly manual annotation of attribute labels. Instead the feature learning engine can rely only on information that is easily obtained (e.g., geo-location, weather) as a proxy to learn discriminative features for person attribute classification. The system in at least one embodiment is used to locate missing pets.

The system according to an embodiment of the invention leverages geo-location and weather information to learn features for person attribute classification, such as facial attributes (e.g., hair color, hair style, facial hair, etc.) and clothing attributes (e.g., clothing type such as jackets, t-shirts, etc.) based on deep learning. The system can also find missing people based on estimated facial and clothing attributes.

Figure 1:
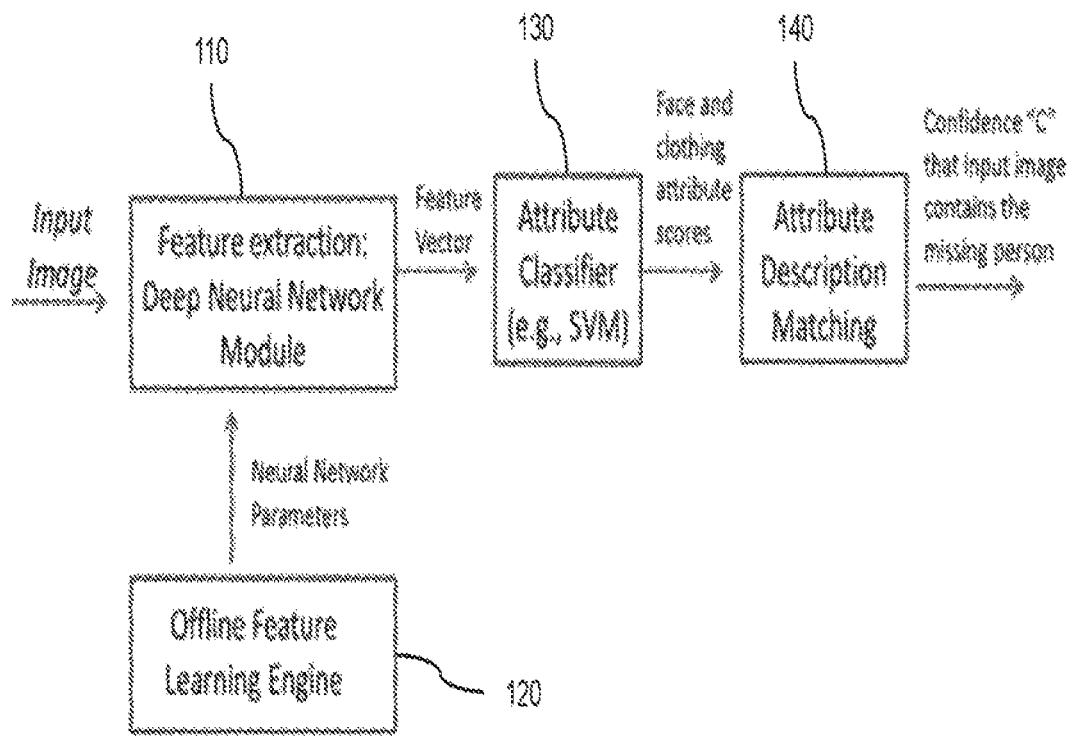
FIG. 1 is a diagram illustrating a system for finding missing persons according to an embodiment of the invention.

FIG. 1 is a diagram illustrating a system for finding missing persons by learning features for person attribute classification based on deep learning. Given an input image of a person, a feature vector can be extracted from the image by using a deep neural network module 110. The neural network parameters can be defined by a feature learning engine 120 (e.g., offline training stage). The feature vector can be fed into an attribute classifier 130 (e.g., based on Support Vector Machines) to produce face and clothing attribute scores. For example, for a missing person with a beard and a jacket, the attributes "has beard" and "wearing jacket" have high scores. The scores can be 0 or 1. The attribute description matching component 140 may compare these scores with a given description of a missing person to produce the final Confidence "C" that the input image contains the missing person.

The system can leverage geo-location and weather information to construct discriminative features for person attribute classification without requiring costly manual labels in the training stage. A person can walk across different neighborhoods of a city using a wearable camera equipped with a GPS sensor in order to obtain geo-tagged images. A large set of geo-tagged images is available on the web. Weather information for a given geo-location is also available on the Internet or through proprietary systems.

The way people look and the clothes they wear may be highly correlated to geo-location and weather, respectively. Moreover, the weather condition can influence the facial appearance changes due to lighting variation, and can also dictate the clothing and accessories people wear. As an example, on sunny and warm days, the likelihood of wearing sunglasses, baseball hats, t-shirts, and shorts increases, whereas the presence of scarfs, beanies, and jackets is much more frequent on cold days.

For example, a person with a wearable camera captures images in different regions, of a city, town, and/or state. When a network to classify these regions is trained solely based on facial appearance, features related to other facial attributes can be learned. In at least one embodiment, census data is used to classify the regions. Similarly, when a classifier is trained to differentiate a cold day versus a warm day based on clothing appearance, powerful visual features can be learned that implicitly discriminate jackets versus t-shirts, shorts versus pants, etc.

In addition to geo-location and weather condition, the feature learning engine also receives as input pairs of images with the information of whether they belong to the same person or not. These pairs of images are generated automatically without manual labeling by a video processing module to be described later. Given an image pair, the feature learning engine is trained to predict whether the images belong to the same person or not. It has been shown in previous work that doing this optimization induces the network to learn identity-related features (such as gender and age), which are complementary to the features learned by geo-location and weather prediction.

To summarize, a feature learning engine includes a deep neural network which is trained to simultaneously predict geo-location, weather condition, and similarity of image pairs, without requiring costly manual labels. The learned features can then be used by a face/clothing attribute classifier (e.g., based on SVMs) as discussed above.

Figure 2:
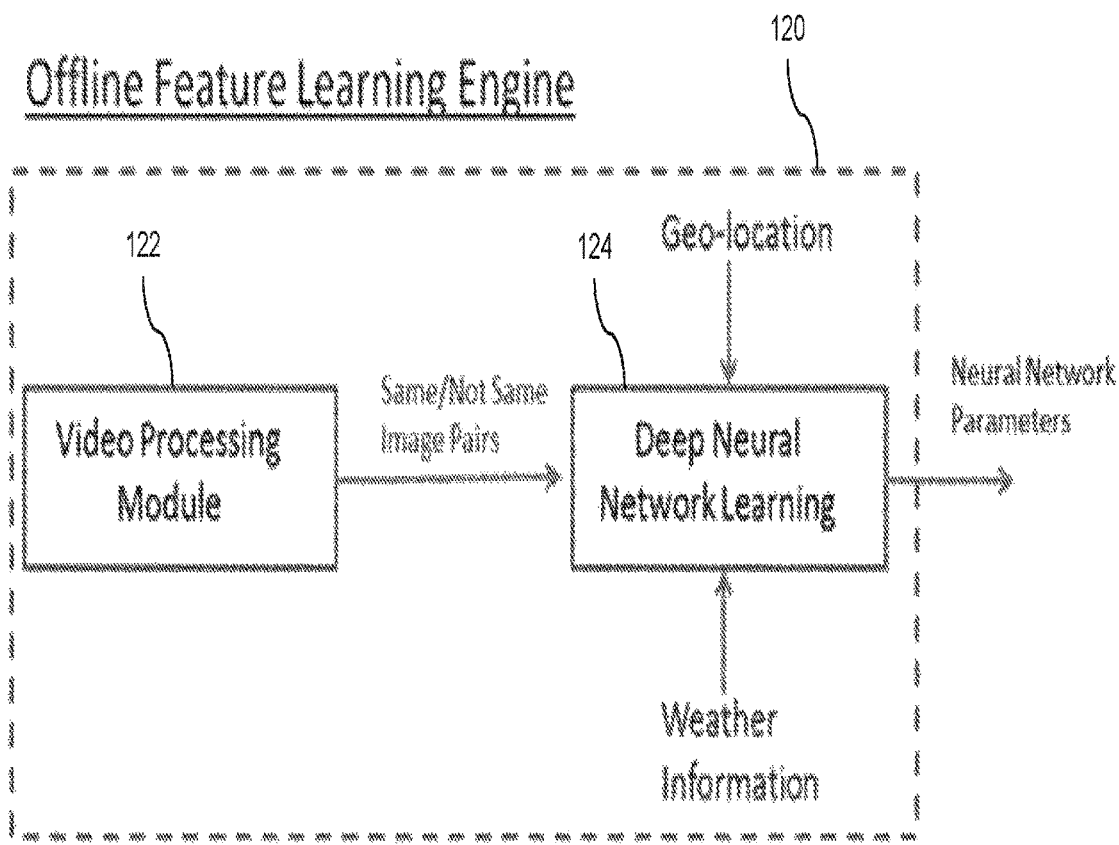
FIG. 2 is a block diagram for the feature learning engine and the objective function used to optimize the deep neural network according to an embodiment of the invention.
Figure 3:
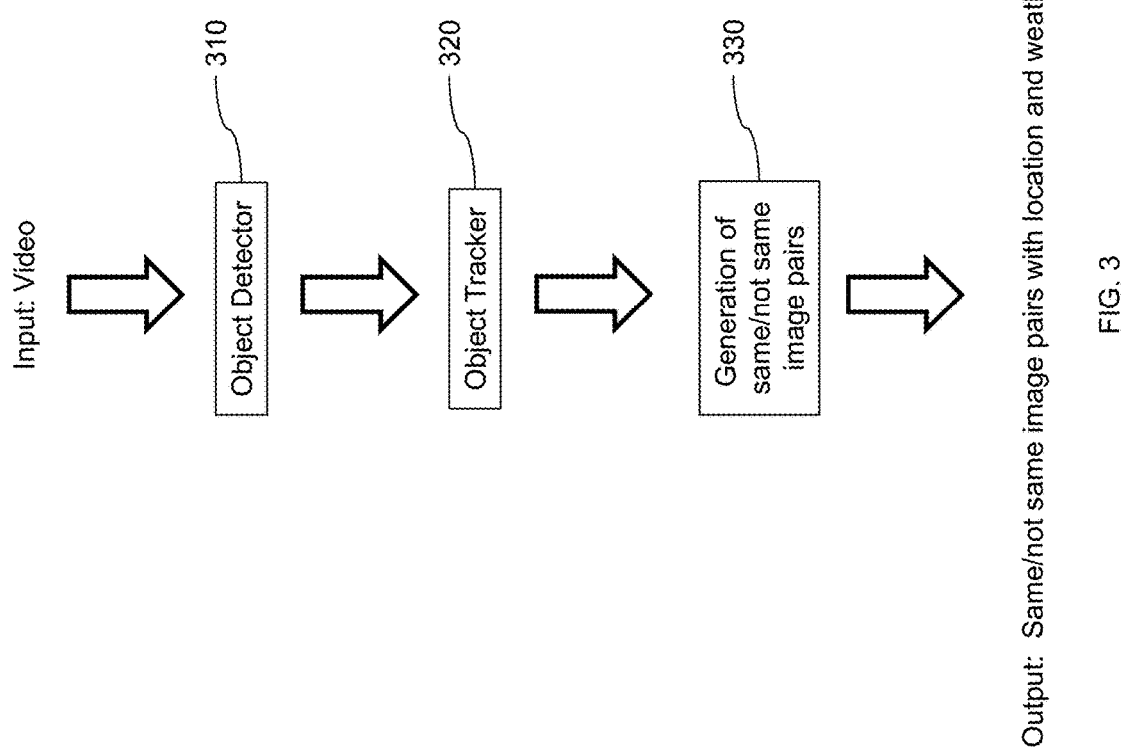
FIG. 3 illustrates actions performed by the video processing module according to an embodiment of the invention.

FIG. 2 is a block diagram for the feature learning engine and the objective function used to optimize the deep neural network. The offline feature leaning engine 120 can include a video processing module 122 and a deep neural network learning module 124. As mentioned above, the video processing module 120 can generate image pairs from videos with the information of whether the pair of images belong to the same person or not. The deep neural network learning module 124 can train a network (i.e., produce neural network parameters) to map pairs of images to their respective labels (e.g., geo-location, weather, and same/not same information). The deep network (with the new learned/produced parameters) can be used for feature extraction (see deep neural network module 110). The following provides a formula for deep neural network learning according to at least one embodiment of the invention:

$$\theta^* = \operatorname*{argmin}_{\theta} \underbrace{L_e(\theta, \mathcal{U})}_{\text{Image pair similarity}} + \lambda \underbrace{L_c(\theta, \mathcal{L}^w)}_{\text{Weather}} + \gamma \underbrace{L_c(\theta, \mathcal{L}^g)}_{\text{Geolocation}}$$

wherein:
θ is a neural network parameter;
L is a confidence level;
U is a mapped pair of images labeled same/not same;
$L^w$ is a mapped pair of images labeled to weather;
$L^g$ is a training set of images labeled to geolocation;
$L_e$ is a function that measures the agreement of an image pair; and
$L_c$ is a function that measures the agreement of an image and a predicted label;

FIG. 3 illustrates how the video processing module 120 generates same/not same image pairs by using an object tracker. Two images that belong to the same track can be labeled as belonging to the same person. A "track" can refer to the same person tracked over consecutive video frames. When the network is forced to preserve similarity of faces connected by the same track, invariances to different lighting conditions and pose variations can be learned because each track can have faces of the same person under different poses/lighting. Thus, the system is able to classify a person with beard, for example, irrespective of the face pose and the lighting condition.

By tracking the faces of casual walkers on more than 40 hours of egocentric video, we are able to cover tens of thousands of different identities, and automatically extract nearly 5 million pairs of images connected by or from different face tracks with weather and location context, under pose and lighting variation.

Input video (e.g., from a wearable camera) and/or a video frame can be received in an object (face and clothing) detector 310. A bounding box in the face/clothing region can be output. An image region underlying a detection bounding box can be input into an object (face and clothing) tracker 320, and a sequence of corresponding image regions in subsequent frames can be output. Image regions from tracking can be input into a generation of same/not same image pairs module 330, and a large set of image pairs containing same/not same labels can be output. The same/not same image pairs can include location (e.g., obtained via GPS) and/or weather information (e.g., obtained via a weather app).

Figure 4:
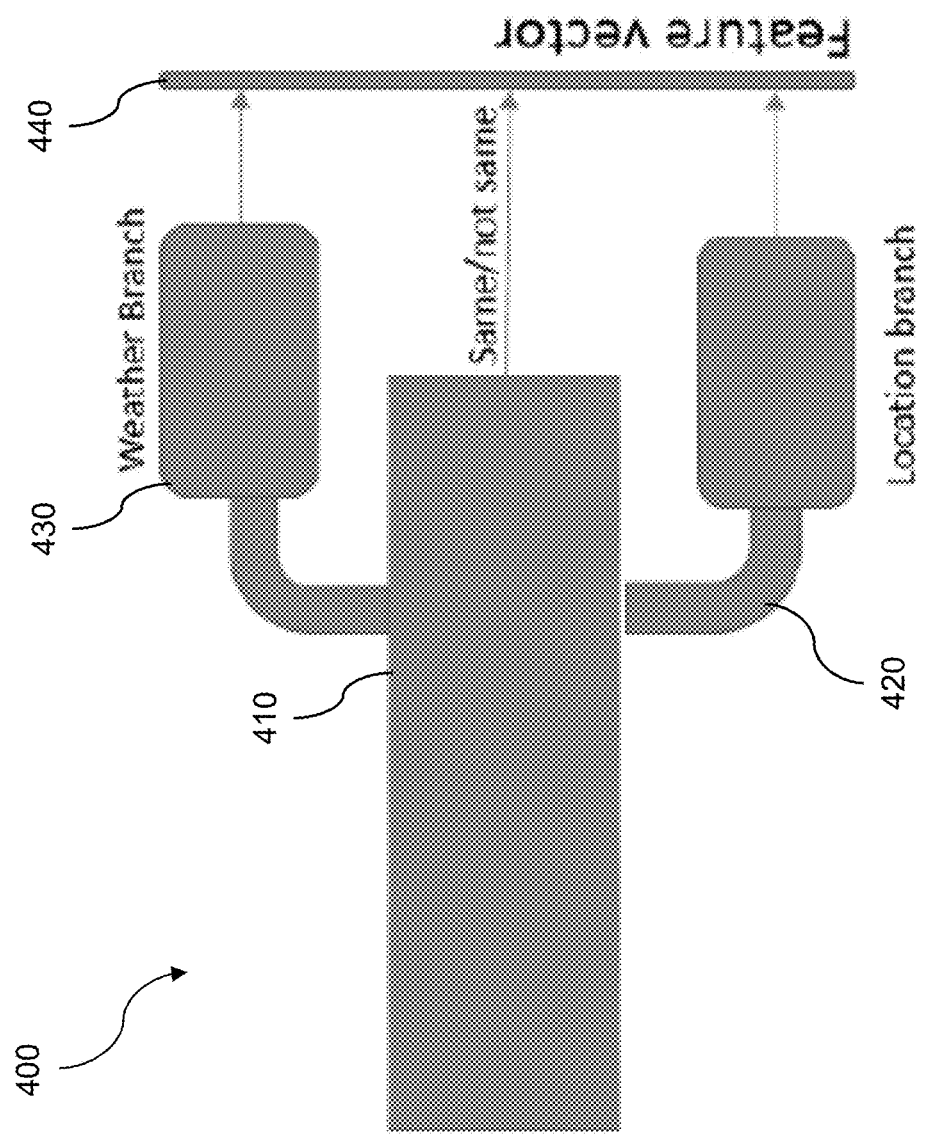
FIG. 4 illustrates a system for finding missing persons according to an embodiment of the invention.

FIG. 4 illustrates a neural network 400 for finding missing persons according to at least one embodiment of the invention. The neural network 400 can include a Siamese network 410 for determining whether images of an image pair include the same person. The neural network 400 can also include a location branch 420 for identifying the geographic locations of the training images (also referred to herein as a "first network branch") and a weather branch 430 for identifying weather information for each of the identified geographic locations (also referred to herein as a "second network branch"). The neural network 400 can extract a feature vector 440 from the image.

Figure 5:
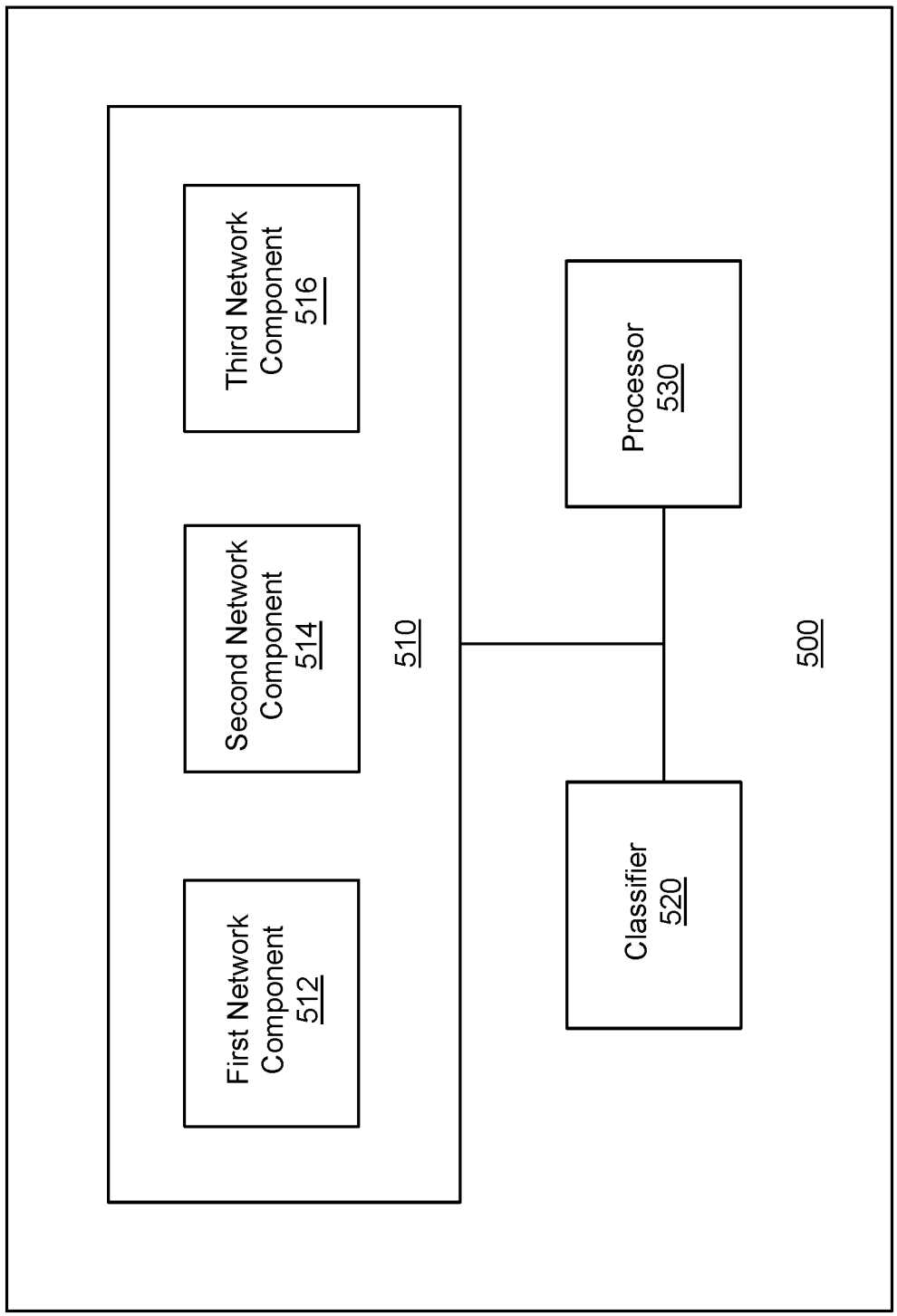
FIG. 5 is a diagram illustrating a system for finding missing persons by learning features for person attribute classification based on deep learning according to an embodiment of the invention.
Figure 6:
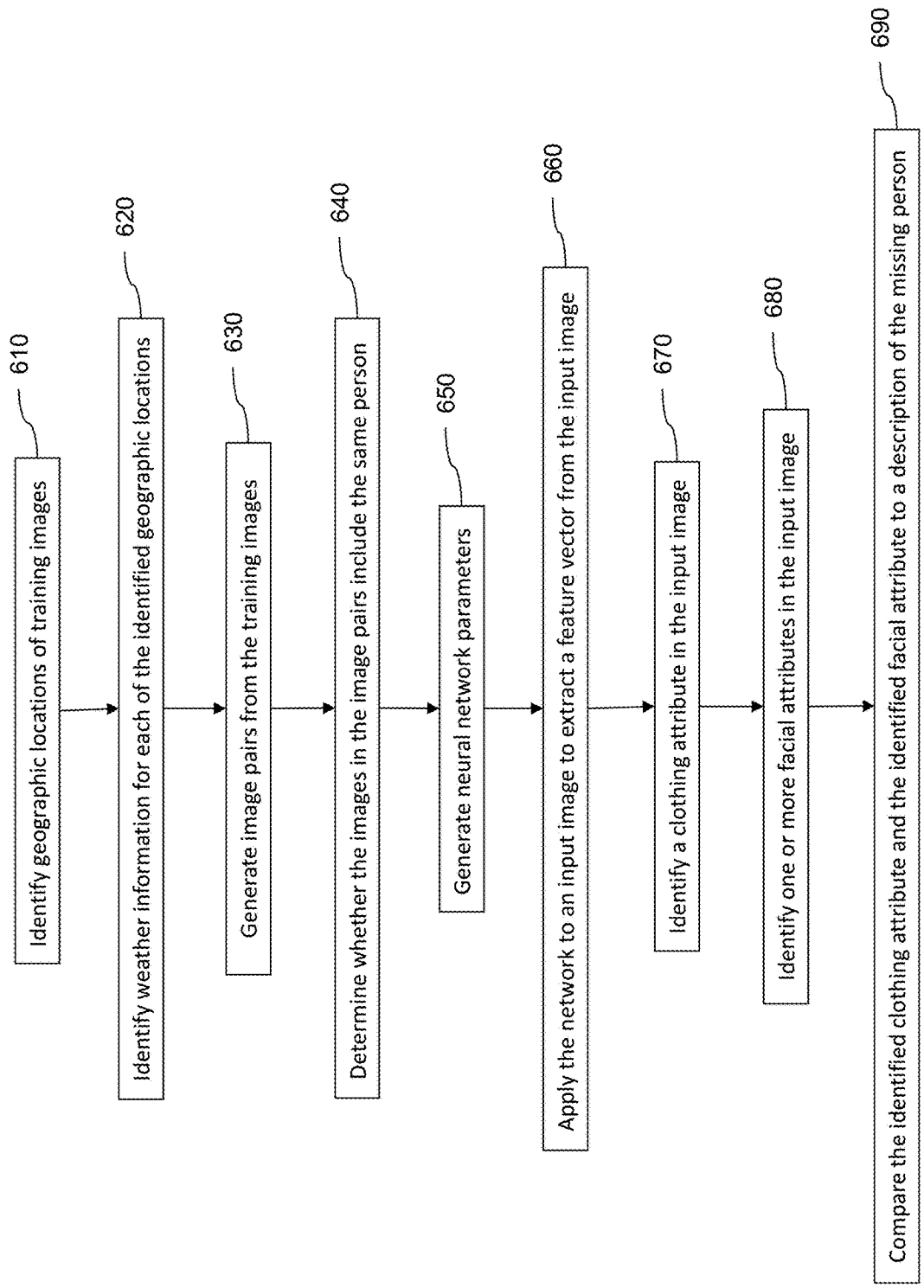
FIG. 6 is a flow diagram illustrating a method for finding missing persons by learning features for person attribute classification based on deep learning according to an embodiment of the invention.

FIG. 5 is a diagram illustrating a system 500 for finding missing persons by learning features for person attribute classification based on deep learning according to at least one embodiment of the invention. FIG. 6 is a flow diagram illustrating a method for finding missing persons by learning features for person attribute classification based on deep learning according to at least one embodiment of the invention (e.g., using the system 500). A first component 512 of a network 510 (also referred to herein as the "neural network") can identify geographic locations of training images (610). For example, the geographic location can be identified by a GPS device in the camera. A second component 514 of the network 510 can identify weather information for each of the identified geographic locations (620). For example, an online weather tool (e.g., a weather app or weather website) can be accessed given the zip code where a photograph was captured.

A third component 516 of the network 510 can generate image pairs from the training images (630). For each image pair, the third component 516 can determine whether the images in the image pair include the same person (640). As used herein, the terms "first component", "second component", and "third component" include computer hardware devices that form a part of a computer network, such as, for example, a central processing unit (CPU), an integrated circuit, or a microprocessor.

The network 510 can generate neural network parameters with the identified geographic locations, the weather information for each of the identified geographic locations, and the determination of whether the images of the image pairs include the same person (650). The neural network parameters can be estimated (i.e., neural network training) by taking the input images and making the network predict the associated geo-location and weather condition and whether the images show the same person or not. This can be performed by feeding the training inputs (e.g., set of pairs of images) and training outputs (e.g., corresponding location/weather/same/not-same info) to algorithms for neural network training. In at least one embodiment, the information about geo-location, weather, and same/not same is obtained without human annotation, is helpful to estimate parameters of the neural network, which is used for the feature vector extraction, which in turn is used for robust estimation of clothing and facial attributes.

The network 510 (with the neural network parameters) can be applied to an input image to extract a feature vector from the input image (660). More specifically, the input image can be fed into the neural network and a sequence of hierarchical computations can be performed to produce a set of scalar values in each layer of the network. As described above, the top of the network can have three branches; and, the set of scalar values produced for each branch can be concatenated to form the feature vector.

In at least one embodiment of the invention, a classifier 520 connected to the network 510 receives the feature vector as input and identifies one or more clothing attribute in the input image (670). The classifier 520 can generate a probability score for each clothing attribute, where the probability score can indicate the probability that the input image includes the clothing attribute. The classifier 520 can also identify one or more facial attributes in the input image (680). The classifier can generate a probability score for each facial attribute, where the probability score can indicate a probability that the input image includes the facial attribute.

A processor 530 connected to the classifier 520 can compare the identified clothing attribute and the identified facial attribute to a description of the missing person to determine the probability that the missing person is shown in the input image (690). For example, the processor 530 can compare the clothing attributes "wearing black vest" and the facial attribute "has blonde mustache" with the description of the missing person (e.g., "male in early 20's having a blonde mustache and wearing a black vest" to produce the final Confidence "C" that the input image contains the missing person. As used herein, the terms "classifier" and "processor" each includes a computer hardware device, such as, for example, a central processing unit (CPU), an integrated circuit, or a microprocessor. As used herein, the term "connected" includes operationally connected, logically connected, in communication with, physically or wirelessly connected, engaged, coupled, contacts, linked, affixed, and attached.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
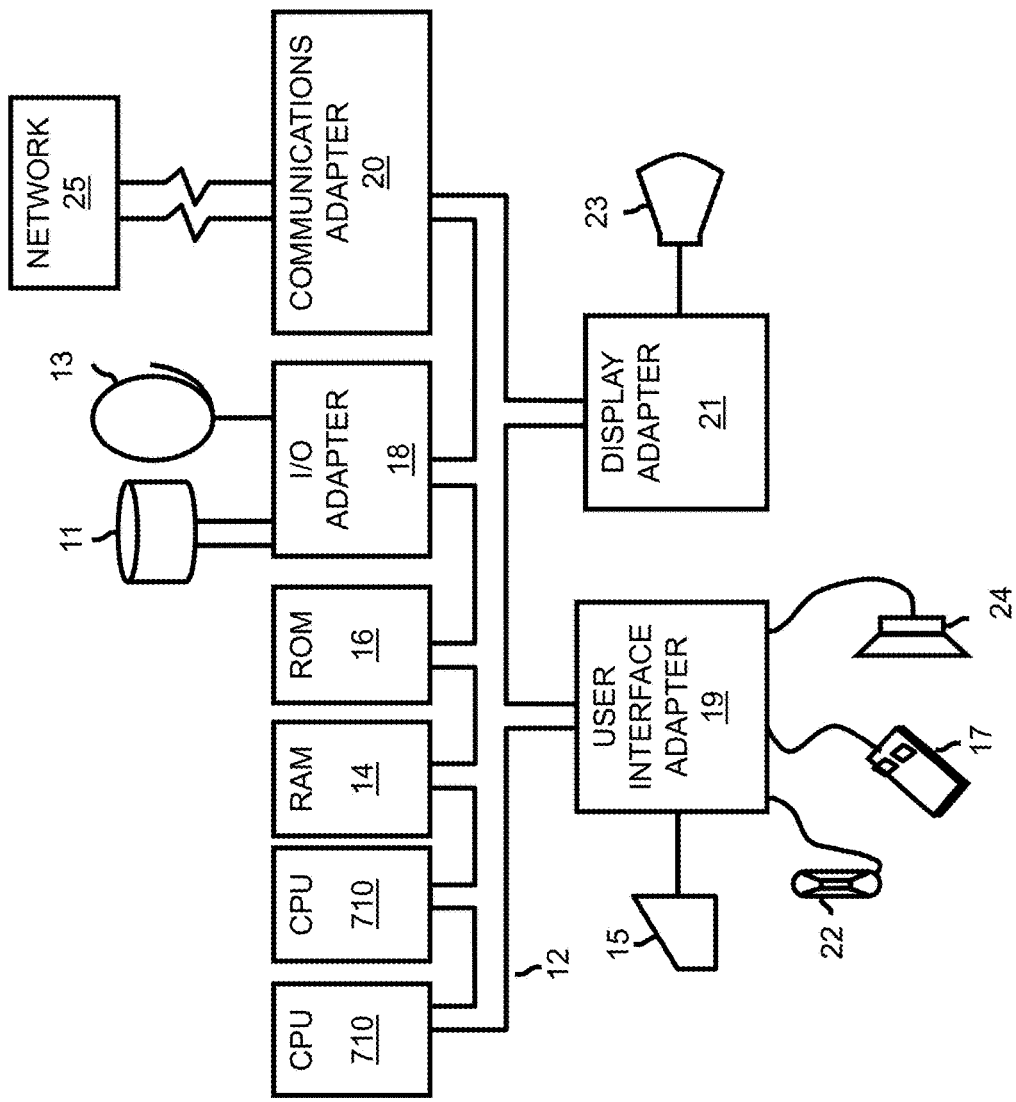
FIG. 7 is a diagram illustrating a computer program product for bias of physical controllers in mechanical systems according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 710. The CPUs 710 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
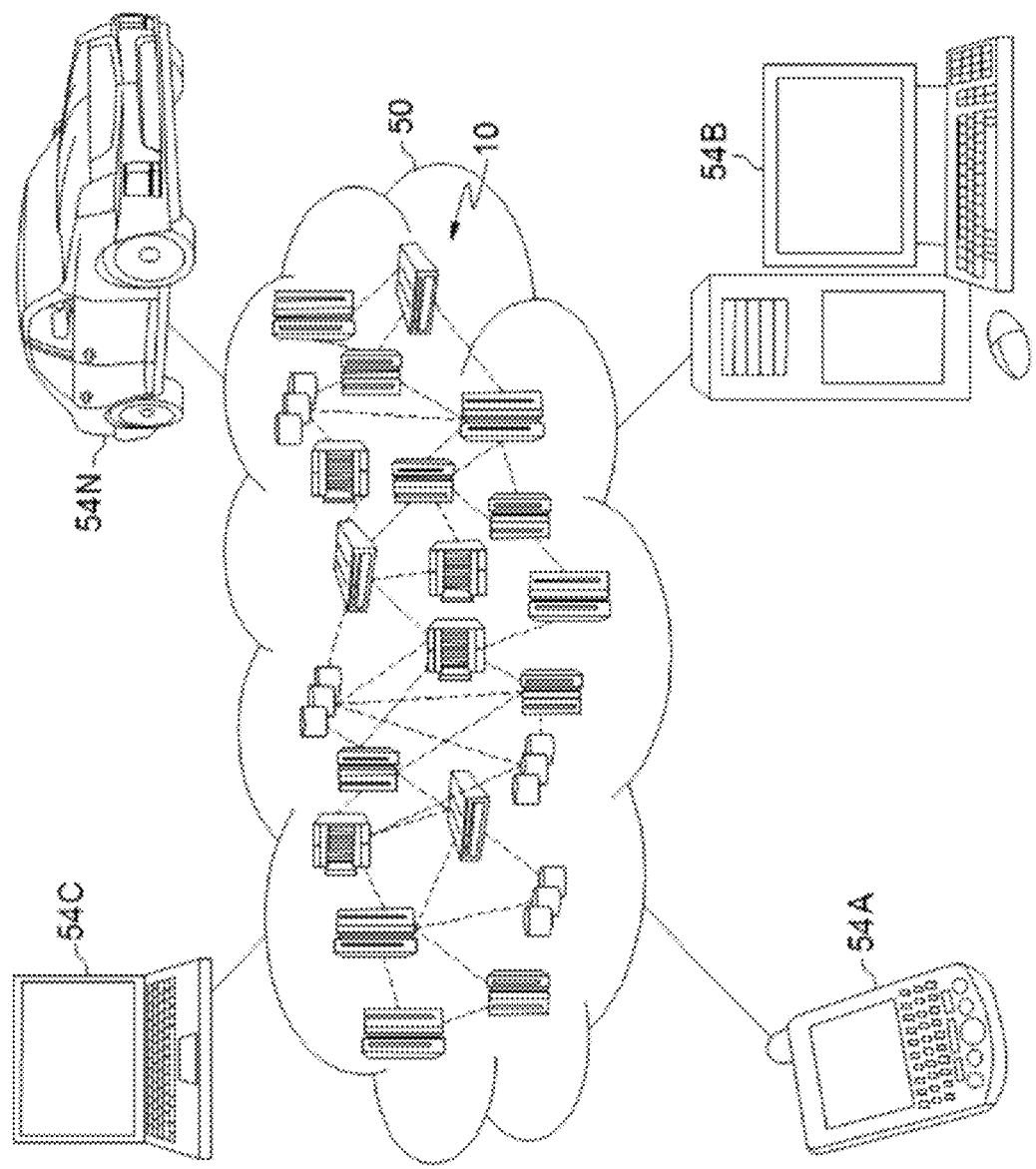
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
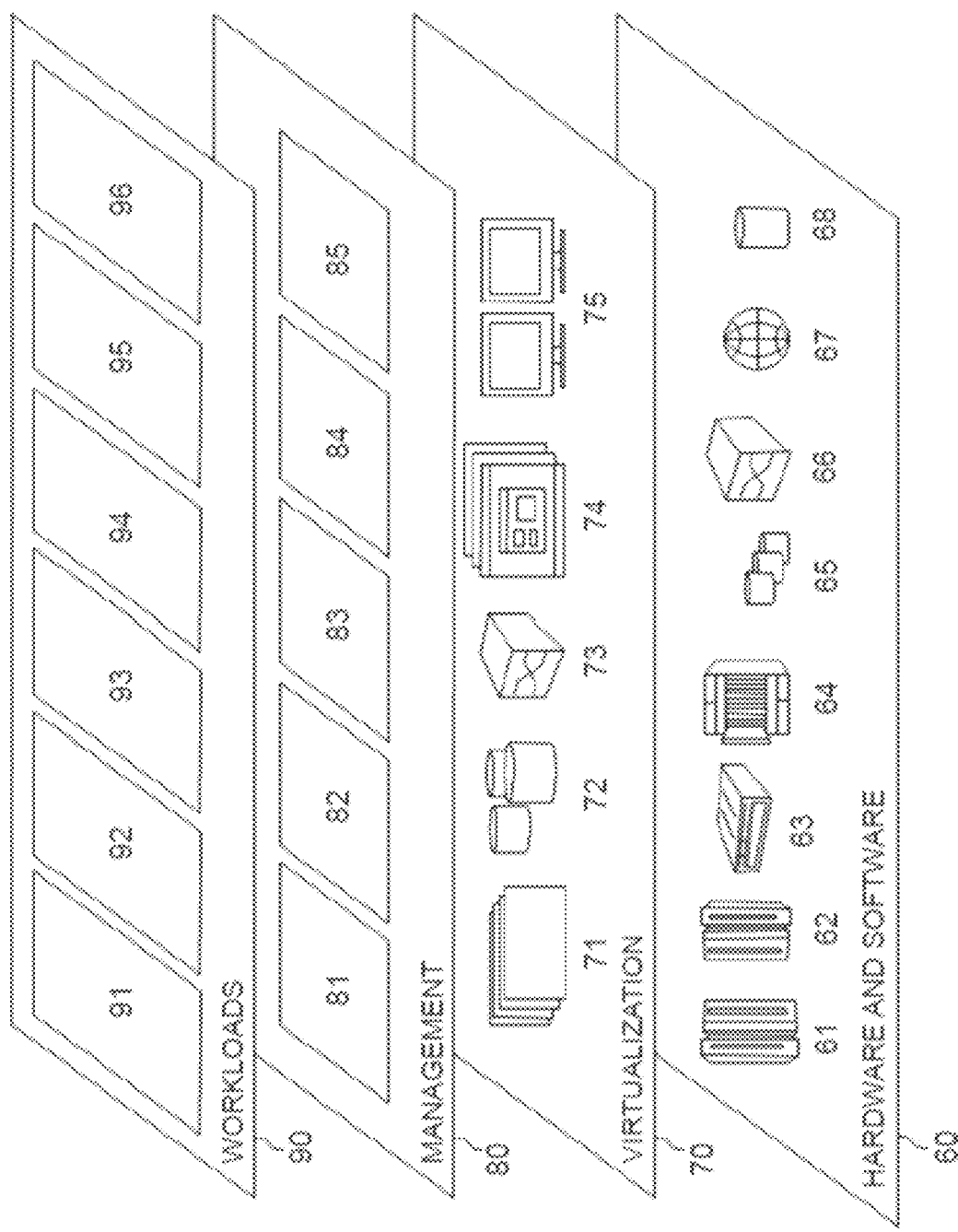
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and finding missing persons 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   identifying geographic locations of training images;
   identifying weather information for each of the identified geographic locations;
   generating image pairs from the training images;
   for each image pair of the image pairs, determining whether images of the image pair include the same person; and
   generating network parameters for a neural network with the identified geographic locations, the weather information for each of the identified geographic locations, and the determination of whether the images of the image pairs include the same person,
   wherein the identified geographic locations, identified weather information, and determination of whether the images of the image pair include the same person are obtained without human annotation.

2. The method according to claim 1, wherein said identifying of the geographic locations of training images is performed by a first component of the neural network,
   wherein said identifying of the weather information for each of the identified geographic locations is performed by a second component of the neural network,
   wherein said generating of the image pairs from the training images is performed by a third component of the neural network, and
   wherein said determining of whether the images of the image pairs include the same person is performed by the third component of the neural network.

3. The method according to claim 1, further comprising:
   applying the neural network with the network parameters to an input image to extract a feature vector from the input image;
   identifying at least one clothing attribute in the input image with a classifier that receives as input the feature vector;
   identifying at least one facial attribute in the input image with the classifier; and
   comparing the identified clothing attribute and the identified facial attribute to a description of a missing person by a processor to determine a probability that the missing person is shown in the input image.

4. The method according to claim 3, wherein said identifying of the at least one facial attribute in the input image includes generating a probability score for each facial attribute, the probability score indicating a probability that the input image includes the facial attribute.

5. The method according to claim 3, wherein said identifying of the at least one clothing attribute in the input image includes generating a probability score for each clothing attribute, the probability score indicating a probability that the input image includes the clothing attribute.

6. The method according to claim 3, wherein said applying of the neural network to the input image includes:
   performing a sequence of hierarchical computations to produce a set of scalar values in each branch of the network; and
   forming the feature vector by concatenating the sets of scalar values.

7. A method for finding missing persons by learning features for person attribute classification based on deep learning, said method comprising:
   identifying geographic locations of training images by a first component of a neural network;
   identifying weather information for each of the identified geographic locations by a second component of the neural network;
   generating image pairs from the training images by a third component of the neural network, the image pairs being generated automatically by a video processing module, the video processing module including an object detector and tracker to detect and track people over a video sequence, and an image pair generator;
   for each image pair of the image pairs, determining whether images of the image pair include the same person by the third component of the neural network; and
   generating neural network parameters by the neural network, the neural network parameters being generated with the identified geographic locations, the weather information for each of the identified geographic locations, and the determination of whether the images of the image pairs include the same person,
   wherein the identified geographic locations, identified weather information, and determination of whether the images of the image pair include the same person are obtained without human annotation.

8. The method according to claim 7, wherein said image pair generator:
   labels a first person and a second person as different when the first person occurs in the same video frame as the second person;
   labels a third person and a fourth person as different when the third person and the fourth person occur in video frames acquired at different locations, and
   labels a fifth person and a sixth person as the same when the fifth person and the sixth person occur in the same region in consecutive video frames.

9. The method according to claim 7, wherein said identifying of the geographic locations of the training images is performed by a first neural network branch of the neural network,
   wherein said identifying of the weather information for each of the identified geographic locations is performed by a second neural network branch of the neural network, and wherein said determining of whether images of the image pair include the same person is performed by a Siamese neural network of the neural network.

10. The method according to claim 7, wherein the neural network is trained to predict the geographic locations and weather.

11. The method according to claim 7, further comprising:
Applying the neural network with the neural network parameters to an input image to extract a feature vector from the input image;
identifying at least one clothing attribute in the input image with a classifier that receives as input the feature vector;
identifying at least one facial attribute in the input image with the classifier; and
comparing the identified clothing attribute and the identified facial attribute to a description of a missing person by a processor to determine a probability that the missing person is shown in the input image.

12. The method according to claim 11, wherein said identifying of the at least one clothing attribute in the input image includes generating a probability score for each clothing attribute, the probability score indicating a probability that the input image includes the clothing attribute.

13. The method according to claim 11, wherein said identifying of the at least one facial attribute in the input image includes generating a probability score for each facial attribute, the probability score indicating that the input image includes the facial attribute.

14. The method according to claim 11, herein said applying of the neural network to the input image include:
performing a sequence of hierarchical computations to produce a set of scalar values in each layer of the neural network; and
forming the feature vector by concatenating the sets of scalar values.

15. A non-transitory computer-readable medium having computer-readable instructions stored thereon which when executed by a computer cause the computer to perform a method comprising:
identifying geographic locations of training images;
identifying weather information for each of the identified geographic locations;
generating image pairs from the training images;
for each image pair of the image pairs, determining whether images of the image pair include the same person; and
generating network parameters for a neural network with the identified geographic locations, the weather information for each of the identified geographic locations, and the determination of whether the images of the image pairs include the same person,
wherein the identified geographic locations, identified weather information, and determination of whether the images of the image pair include the same person are obtained without human annotation.

16. The non-transitory computer-readable medium according to claim 15, further comprising:
applying the network with the network parameters to an input image to extract a feature vector from the input image;
identifying at least one clothing attribute in the input image with a classifier that receives as input the feature vector;
identifying at least one facial attribute in the input image; and
comparing the identified clothing attribute and the identified facial attribute to a description of a missing person to determine a probability that the missing person is shown in the input image.

17. The non-transitory computer-readable medium according to claim 16, wherein the identifying of at least one facial attribute in the input image includes generating a probability score for each facial attribute, the probability score indicating a probability that the input image includes the facial attribute.

18. The non-transitory computer-readable medium according to claim 16, wherein the identifying of at least one clothing attribute includes generating a probability score for each clothing attribute, the probability score indicating a probability that the input image includes the clothing attribute.

19. The non-transitory computer-readable medium according to claim 16, wherein the applying of the network with the network parameters includes
performing a sequence of hierarchical computations to produce a set of scalar values in each layer of the network; and
forming the feature vector by concatenating the sets of scalar values.

* * * * *